Figure 1:
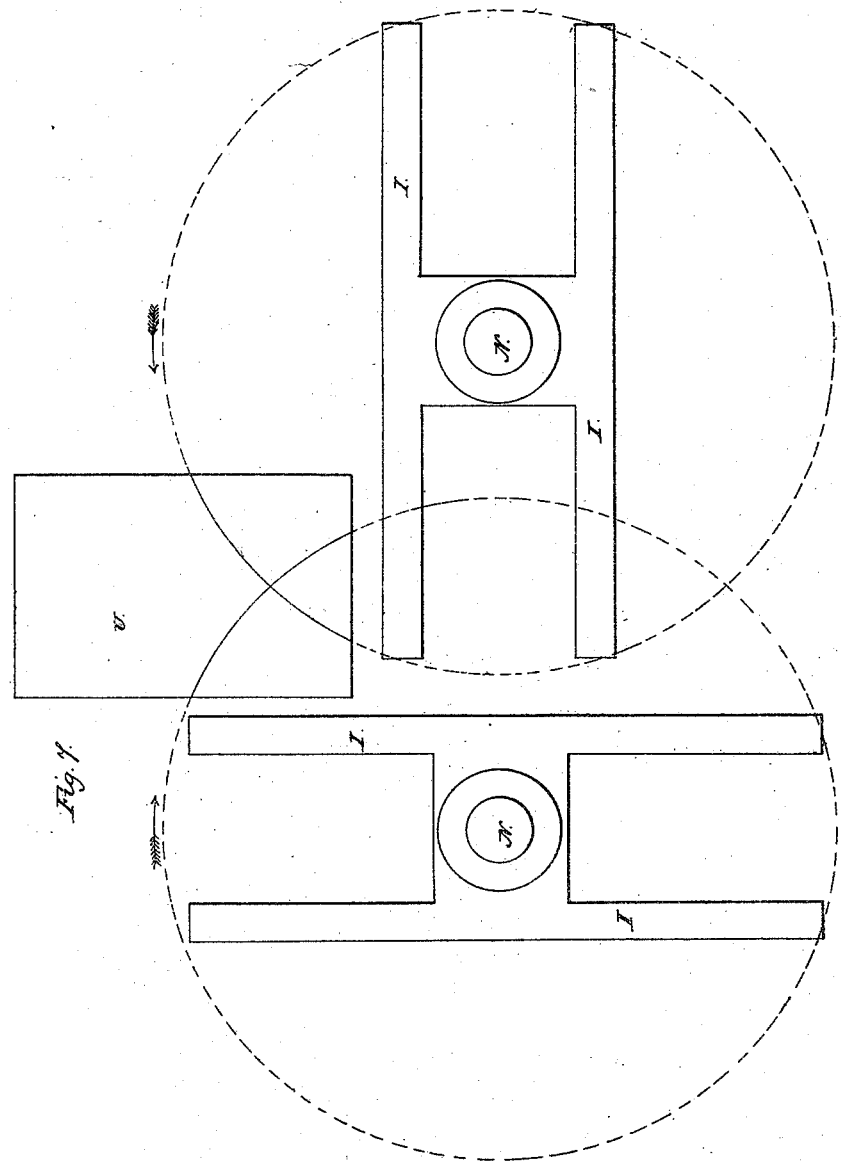

J. W. Cochran,
Dressing Stone.
No. 8,854.        Patented Apr. 6, 1852.
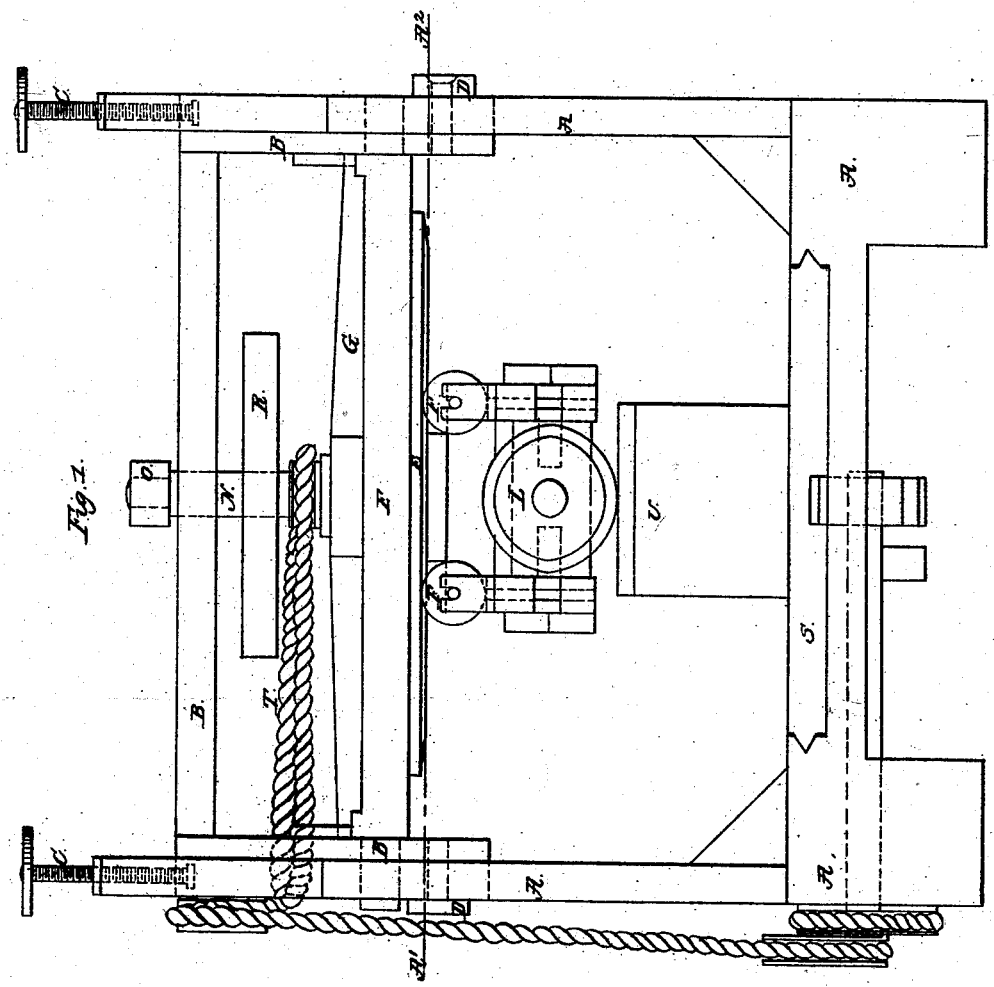

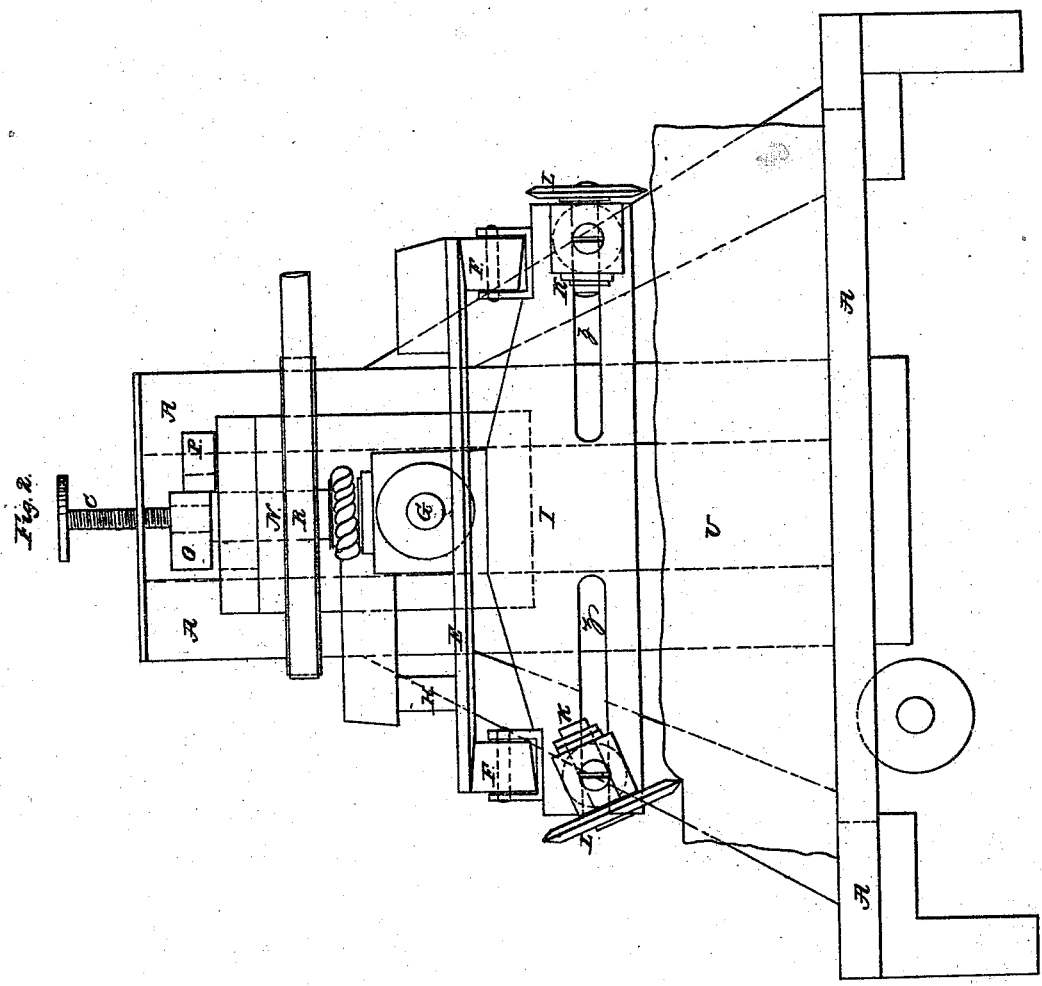

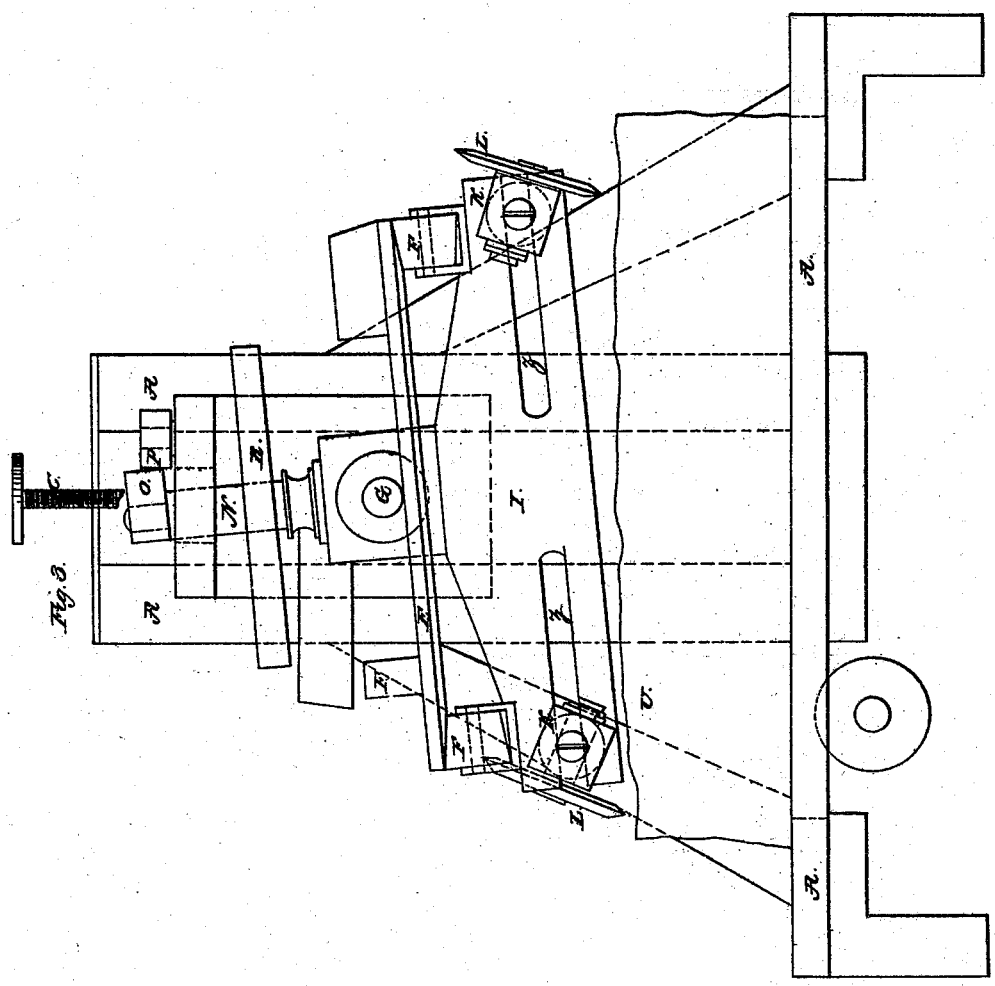
J. W. Cochran,
Dressing Stone.
No. 8,854.   Patented Apr. 6, 1852.

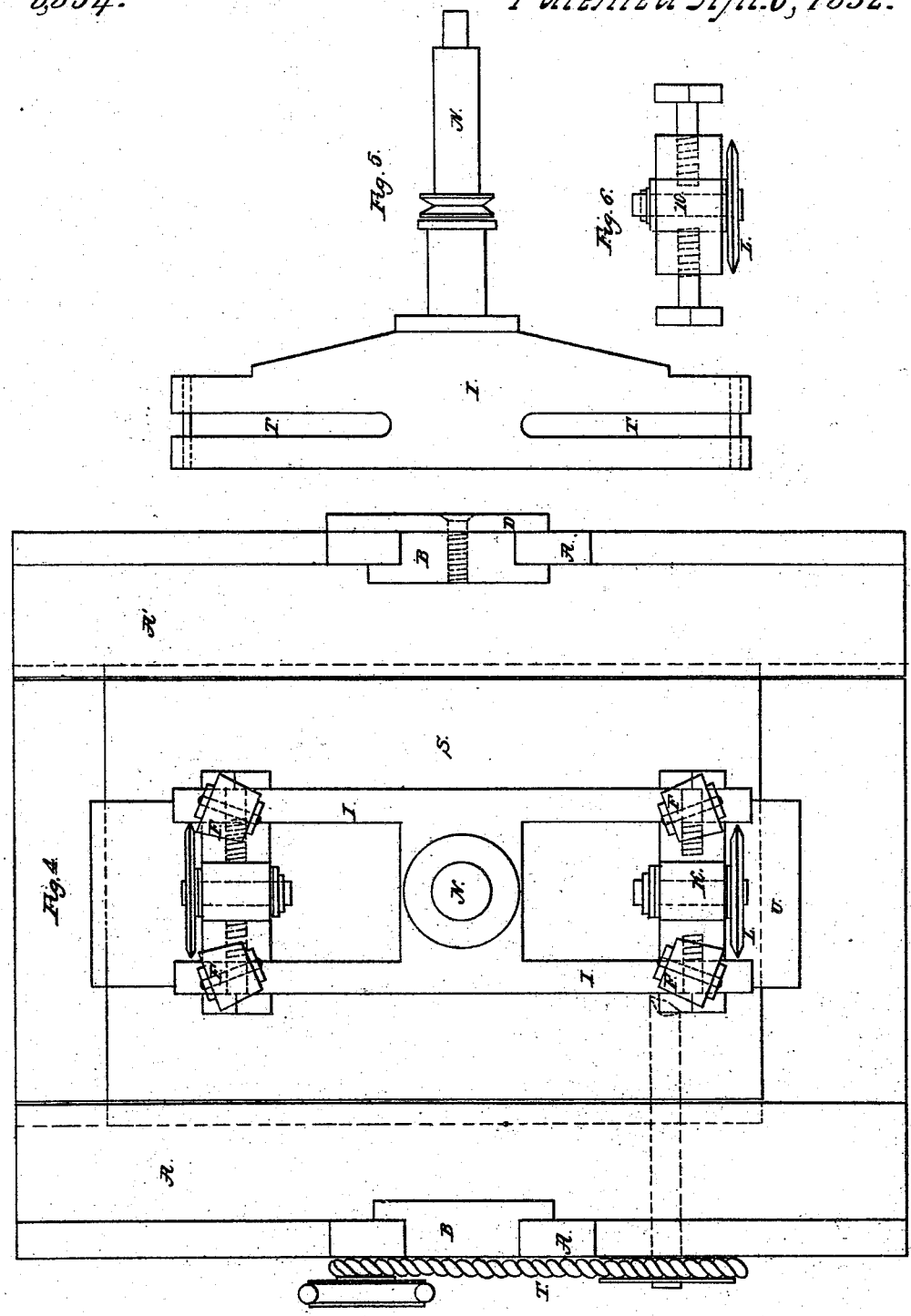

J. W. Cochran,
Dressing Stone.

No. 8,854.　　　　　　　　Patented Apr. 6, 1852.

UNITED STATES PATENT OFFICE.

JOHN W. COCHRAN, OF WILLIAMSBURGH, NEW YORK.

STONE-CUTTING MACHINE.

Specification of Letters Patent No. 8,854, dated April 6, 1852.

*To all whom it may concern:*

Be it known that I, JOHN W. COCHRAN, of Williamsburgh, in the county of Kings and State of New York, have invented new and useful Improvements in Machinery for Cutting and Dressing Stone and Which May Also be Applied to other Purposes; and I do hereby declare that the following is a full and exact description thereof.

The nature of my invention consists in a machine with a rotary cutter or cutters to revolve on their own axis and to move and cut in a curved line over the surface of the stone and so constructed and operated that the direction of the cutter and the surface of the stone forms and at each successive cut leaves a corner edge of the undressed surface of the stone, and the cutter thus continuing to cut or dress the stone on such convex surface or edge and toward the center of its motion in such curved line until the side of the stone is completely dressed; that is to say, the cutter is moved and cuts in a curved line over the surface of the stone in such manner and by such means that the convex side of such curved line is the projecting edge or boundary of the undressed portion of the surface and the concave side of such curved line, so described by the cut of the cutter, is the edge or boundary of the dressed portion of the surface when it meets that part which is undressed. By means of which the cutter as it approaches and leaves the stone in such curved line attacks and leaves the surface in a manner and with conditions different from what has been heretofore done and so as to form a plain and well dressed surface and a more even and true arris to the stone than can be done by the machines known before my said invention.

To enable others to make and use my invention I will describe its construction by reference to the drawings hereto annexed which make a part of the description and in the several figures of which like letters represent like parts.

The machine complete consists first of a main frame to support the other parts; second, a frame sliding vertically in such main frame to adjust the position of the cutter jaws; third, rotating cutter jaws, with the cutter or cutters, cutter holders and other appendages; fourth, a rock shaft with its appendages, and fifth, means of adjustment and a device for feeding the stone to the cutter.

Figure 1, is an end view. Fig. 2, is a side view, with that side of the frame next to one taking such view removed and the opposite side of the frame shown by dotted lines and with the cutter jaws and a cutter in the position of cutting. Fig. 3, is a like view with the cutter jaws in the position which it takes when the cutter is passing over the rough or undressed part of the stone toward the end of the stone opposite to where it is being cut. Fig. 4 is a plan or top view with the parts above the rotating cutter jaws and friction rollers removed; that is, with the parts removed which are above the intersecting red line $A^1$, $A^2$, in Fig. 1. Fig. 5 is a side view of the cutter jaws and its shaft. Fig. 6 is a plan or top view of a cutter holder and cutter.

A, A, A, A, is the main frame for supporting the other parts and which may be made of any material and in any form of sufficient strength and adapted to support the other parts.

B, B, B, is a frame composed of the cross piece extending across from one side to the other of the main frame permanently attached to a piece at each end extending downward from said cross piece sufficiently far to form bearings for the rock shaft. This frame B, B, B, is to slide up and down guided at each end by upright posts of the main frame by shoulders in the end pieces of said sliding frame locking between the upright posts of the main frame or by any other suitable fixture for that purpose.

C, C, are two screws working through bars or pieces permanently attached to the upright posts of the main frame, and into the sliding frame by which the elevation of the sliding frame may be adjusted.

D, D, are pieces on the outside of the posts of the main frame and attached by screws to the end pieces of the sliding frame, and which together with said end pieces form clamps, grasping the upright post of the main frame, and which when tightened by the screws, assist the screws C, C, in holding firmly said sliding frame at any desired elevation.

E, is a circular disk or guide table against the under side of which revolve the friction or guide rollers F, F, F, F, and which disk is attached to the rock shaft G.

H, is a cross bar attached to the upper side of that part of the disk or guide table under which the cutter cuts the stone, and this cross bar H, extends far enough beyond the table at each end to lock under pieces permanently attached to the end pieces of the sliding frame B, the object of which is to hold the cutter firmly down upon the stone while cutting and to keep the cutter at the proper elevation.

I, is the rotating cutter jaws which carry the cutter or cutters. These jaws consist of two side bars of such length as to revolve within the upright posts of the main frame and are connected together at or near the center; on the upper side of each end of each of these side bars is a friction or guide roller F, mounted in suitable bearings attached to said side bars which rollers as above stated, revolve in contact with the under side of the guide table or circular disk E. Fig. 5 shows a side view of one of these cutter jaws.

The slots J, J, in the jaws receive cutter holders K, to which the cutter L, is bolted or otherwise attached. Fig. 6 represents a plan of one of these cutter holders with the cutter attached. The cutter must be so attached to the holder as to revolve as it passes over and cuts the stone which may be done by the cutter being fixed on the end of a short shaft with the other end of the shaft passing through the holder R, and so as to revolve in said cutter holder.

The cutter holder R, should be so held in the slots J, J, that it can be turned on its axis when required so as to raise or lower the cutters in order to give the cutter the desired pitch or position to best cut the stone, and in order also to raise the cutter entirely clear from the stone when desired. This may be done by having journals of the cutter holders K, projecting through the slots with nuts screwed on the projecting ends so as to ease or tighten them by turning the nuts as desired.

The cutters L, are rings or circular disks of steel or other metal of sufficient hardness to cut stone fixed to the cutter holders as described.

The cutter jaws are hung upon the lower end of an upright shaft N, which shaft passes up through the rock shaft G, and through the cross piece of the sliding frame B, and in which it revolves carrying with it the cutter jaws there being a collar on the shaft N, on each side of the rock shaft to sustain it. The hole through the cross piece of the sliding frame B, in which the upright shaft N, revolves is oblong so as to admit of the shaft turning with the rock shaft G. The shaft N, projects a short distance through and above the cross piece of the frame B, and on that projection is firmly fixed a cam O, which acting in connection with a roller P, mounted on a stud in the top of the said cross piece of frame B, gives the rocking or tumbling motion to the shaft N, and consequently to the rock shaft G, disk E, and cutter jaws J, J, and cutters L, L. Said cam must be so formed as to not give the shaft N, any rocking or tumbling motion while the cutters are actually passing over the stone and cutting otherwise the surface would be dressed unevenly; the said cam should therefore be of such form as to give the shaft N, a tumbling motion only to raise and carry the cutters over the undressed part of the stone at each rotation of the cutter jaws. Below the cross piece of the frame B, on the shaft N, is the drum or pulley R, by which the power is connected to drive the machine.

The stone U, to be cut is placed upon the carriage S, and while being dressed must be advanced or moved under the cutter sufficiently fast to present to the cutter a new surface of the rough part to the cutter at each revolution of the cutter jaws, which may be done by a continuous or an intermittent feeding motion and by any of the well known arrangements for like purposes. I have represented in the drawings an arrangement of moving this carriage to feed the stone to the cutter by means of the cord or belt T, T, with which it connects but as the manner of doing this may be varied and is so well known, I do not deem a further description thereof necessary.

The annexed drawings are made to a scale of three quarters of an inch to one foot of a machine of sufficient working size, by which the relative size of the several parts appears from the drawings.

But the size of machines as well as the relative size of parts may be varied as circumstances may require.

The material of the machine may of course be varied, but the material which I prefer is iron and the cutter jaws can most advantageously be made of cast iron.

The machine may be constructed and operated with only one cutter or there may be several cutters and cutter holders in a jaw and with the cutters all set so as to cut but on different planes, or there may be some set to cut and others turned up.

When using the tumbling or rocking motion, if cutters are placed in both ends of the jaws the cutters at one end should be elevated by turning their holders so that the cutters at that end will not come in contact with the stone when the cutter jaws revolve it being best to use only the cutter or cutters in one end of the cutter jaws at a time. But when dressing a stone which is so short, or in finishing a stone the undressed portion of which has become so short that the cutters will pass around the undressed end of the stone, and therefore not require the rocking or tumbling motion, then and in that case cutters in each end of the jaws may be brought in action to cut if required.

The machine being constructed as above described, it is adjusted and operated as follows: A stone is placed upon the cutter S, so that one end of the stone will be in position to be fed up to the cutter by the carriage; the cutter at one end of the jaws is then put in the proper position to cut which should be with the cutter turned toward the center of motion of the rotating jaw, but which position will be found by experience to require variation according to the desired depth of cut and which position is adjusted by turning the cutter holder K, and the cutter holder then being firmly fixed by tightening a nut upon the end of the cutter holder outside the cutter jaw; if cutters are also in the other end of the jaws they should be so turned up as to not come in contact with the stone as the cutter jaws rotate; the elevation of the cutter jaws carrying the cutter must then be adjusted by raising or lowering the sliding frame B, till the cutter is brought to a proper elevation to give it the desired depth of cut in the stone; said sliding frame B, being raised or lowered by means of screws, C, and firmly sustained at the desired elevation by means of said screws C, and the tightening of the clamp pieces C. The power is then applied to the drum or pulley R, which may be steam, horse, water or any other sufficient power the cutting then goes on, the shaft N, rock shaft G, cutter jaws and consequently the cutters, rocking at each rotation of the cutter jaws so as to raise the cutters and allow it to pass freely over the rough part of the stone and after so passing over to resume the position to cut a plain even surface to the stone; the stone being fed up to the cutters sufficiently fast to suit the required depth of the cut and the hardness of the stone being dressed, which will be regulated by experience. When the operation has gone on until the undressed part of the stone has become so short that the cutters will pass around the undressed end of the stone, then, if desired, the roller P may be removed and the rocking motion thereby stopped and then too (if desired) cutters in the other end of the jaws may also be brought into action to cut.

Another application of parts of my invention may be made by having the cutter jaws, cutter holders and cutters so arranged that a cutter shall pass on and off of each side of a surface of a stone in a curved line and without going entirely across such surface as represented in Fig. 7, wherein the cutters cut alternately from different sides of the surface, each cutter passing beyond the center of the surface so that the two shall dress the entire surface.

In this application it is evident that the rocking or tumbling motion is not required as the cutters only pass over the stone when required to come in contact with and cut it.

The arrows in Fig. 7 show the direction of the motion of the cutters in this application.

What I claim as my invention and desire to secure by Letters Patent is:—

1. Cutter jaws or their equivalent combined with and carrying a cutter across the stone in the segment of a circle; the cutter being so set that the part of its periphery in contact with the stone when cutting inclines toward, and the part of the periphery opposite thereto, from the axis or center of motion of the cutter jaws for the purpose set forth.

2. The application of revolving cutters to dressing stone, moving and cutting in a curved line across the stone, and on a convex edge of the undressed portion of the surface formed by the line of cut and cutting toward the center of motion of the cutters in such curved line.

3. The combination of a rock shaft with cutter jaws to carry the cutters over and clear from the undressed portion of the stone substantially as described and for the purposes set forth.

4. The combination of the rock shaft, guide table, and friction rollers and their equivalents substantially as described and for the purpose set forth.

5. The combination of the rock shaft and cam and roller to produce the rocking or tumbling motion substantially as described.

J. W. COCHRAN.

Witnesses:
MILES B. ANDROS,
WM. P. RICHARDSON.